June 6, 1961 G. W. OBERLE 2,987,710
SHAFT POSITION INDICATOR
Filed Jan. 14, 1957 6 Sheets-Sheet 2

Fig 2

INVENTOR
GEORGE WILLIAM OBERLE
BY Julian C. Renfro
ATTORNEY

Fig. 4.

June 6, 1961  G. W. OBERLE  2,987,710
SHAFT POSITION INDICATOR

Filed Jan. 14, 1957  6 Sheets-Sheet 5

INVENTOR
GEORGE WILLIAM OBERLE
BY 
ATTORNEY

June 6, 1961 G. W. OBERLE 2,987,710
SHAFT POSITION INDICATOR

Filed Jan. 14, 1957 6 Sheets-Sheet 6

Fig. 8

INVENTOR
GEORGE WILLIAM OBERLE
BY Julian C. Renfro
ATTORNEY

United States Patent Office 2,987,710
Patented June 6, 1961

2,987,710
SHAFT POSITION INDICATOR
George William Oberle, Haddonfield, N.J., assignor to
The Martin Company, a corporation of Maryland
Filed Jan. 14, 1957, Ser. No. 634,092
12 Claims. (Cl. 340—206)

This invention relates to a device for indicating shaft position, and more particularly to a system for sensing the position of a shaft rotating at high speed, and for indicating shaft position as a discrete quantity.

In the past, many devices have been proposed for measuring the position of an input shaft. One such device for measuring shaft position utilizes fixed signal heads and a movable head. When a single pulse recorded on a first track of a rotating drum passes one of the fixed pickup heads, a gate is opened for a continuous array of pulses generated in the other pickup head, which is located in operative relation with another track on the drum. This array of pulses is counted with a binary counter until a single pulse recorded on a third signal track on the drum passes the movable pickup head. The gate passing the continuous array of pulses from the fixed head is then closed. At this instant, the count at the binary counter is the angular displacement of the input shaft from the earlier mentioned fixed pickup head, which received the single pulse to open the gate. This type of device allows only one position measurement per revolution of the drum, and although it is operable when the angular rotation rate of the input shaft is less than one angular increment per drum revolution, for higher input shaft speeds, accurate angular position cannot be determined between measurement periods.

The shaft position indicator according to this invention is a high speed, high accuracy device, whose angular accuracy is dependent primarily upon the accuracy with which the required number of pulses may be spaced on a drum. In one form, the present shaft position sensing device may include amplifying means, first and second signal pickup means delivering signals to the amplifying means, a first and second pulse forming means shaping pulses received from said amplifying means, and a plurality of gating means. The gating means allow the pulses from the first and second pulse forming means to pass when non-coincidence of pulses from the first and second pulse forming means occurs in the gating means and a reversible counting means is provided to receive pulses from the gating means so that the pulses passing through the gating means control the addition and subtraction of discrete quantities by the counting means. The arrangement can be such that when the counting means receives the signal from the first gating means, it produces a subtraction and when it receives a signal from the second gating means, it produces an addition.

According to this invention, additional pickup heads can be utilized so as to provide automatic referencing means for the device. Automatic referencing means include the use of a second counting means, with the pulses registered by the second counting means providing referencing information transferable to the aforementioned reversible counting means.

The present invention can be utilized in digital servo mechanisms, and also finds use in the transmission of radar shaft position where the antenna is mounted remotely from the rest of the radar system. The present device makes it possible to transform shaft position data into a form so that it could be used in a digital computer for the purposes in information processing.

The present converter has sufficient angular accuracy that an accuracy of at least 15 binary digits can be realized. It is also possible to provide angular measurement for input shaft speeds from zero to as high as several hundred revolutions per minute in either direction and will also allow extremely high read-out rates, with each reading correct at the instant of sampling.

The present invention obviates certain of the difficulties inherent in prior art devices, in that it is not sensitive to spurious inputs caused by thermionic noise, hum, and variations in B plus voltage. This immunity is accomplished by integrating the difference frequency over a period of time and requiring only one basic decision to be made instead of several uncorrelated decisions. The present arrangement of logic circuits is particularly valuable where the ratio of the two input frequencies is low, because of the integration feature in the decision elements.

The invention will be further described in connection with the accompanying drawings which illustrate preferred embodiments of the invention. However, it is to be understood that such further disclosure is by way of exemplification and the invention is not limited thereby, but only to the extent set forth in the appended claims.

In the drawings:
FIGURE 1 is a view of typical mechanical equipment that is used in connection with the shaft position to digital converter;
FIGURE 2a is a tabular explanation of symbols used in the figures.
FIGURES 5, 6 and 7 illustrate the pulses produced for different conditions of transfer of the pulse count from counter BC-2 to counter BC-1.

Referring to FIGURE 1, typical mechanical equipment for the shaft position to digital converter is illustrated, with a motor 11 being arranged to drive a small roatably mounted magnetic drum 12 at approximately constant speed. The drum 12 has four tracks, tracks 13 and 14 having continuous pulses recorded thereon, and tracks 15 and 16 having a single pulse each. Two fixed signal pickup heads 17 and 18 are provided, with fixed signal pickup head 17 being positioned to read continuous pulse track 14, and head 18 positioned to read single pulse track 15.

An input shaft 19 is provided, being arranged to be coupled mechanically to the shaft for which position is to be measured. Shaft 19 is rotatably mounted so as to be substantially concentric with magnetic drum 12, and is equipped with an arm 19' holding two movable pickup heads 21 and 22. Head 21 is positioned to read continuous pulse track 13 and head 22 is positioned to read single pulse track 16. The signal from these two rotatable heads is brought out through slip rings 23 on the input shaft.

The improved measurement technique according to this invention utilizes two continuous pulse tracks 14 and 13, which are associated with fixed and rotatable pickup heads 17 and 21, respectively. Each of the two continuous pulse tracks contains a number of uniformly spaced pulses equal to the number (N) of angular increments desired for the input shaft position. The angular spacing between pulses is therefore 360°/N. As will be explained in more detail hereinafter, the single pulse tracks 15 and 16 are utilized as an ancillary measurement scheme for starting, at the proper angle, the reversible binary counter used with this invention.

If the input shaft 19 is stationary, the frequencies of the pulses generated in fixed and movable heads 17 and 21 are the same, whereas if the input shaft 19 is rotating in the same direction as the drum 12, the pulse frequency generated from the rotatable head 21 is lower than that from fixed pickup head 17. Conversely, if the input shaft rotation is opposite to that of the drum, the pulse frequency from rotatable head 21 is higher than that from fixed pickup head 17.

Figure 2:
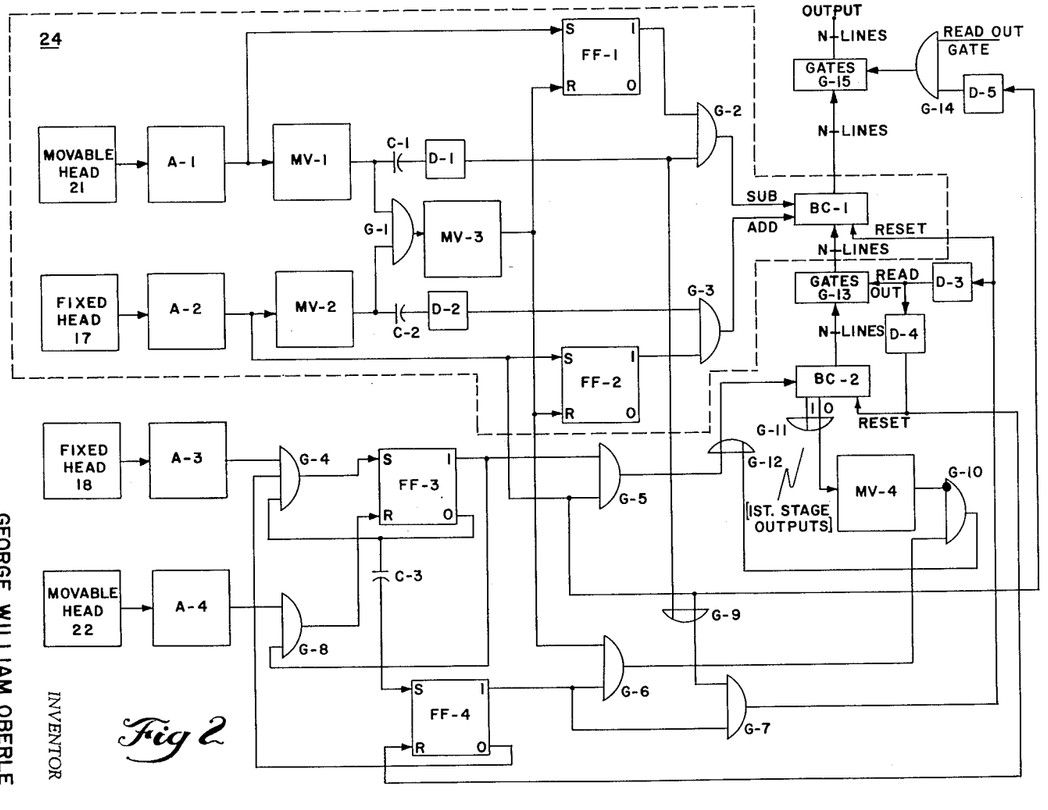
FIGURE 2 is a block diagram using logical symbols of a system for providing shaft position to digital conversion.

Referring now to FIGURE 2, the electronic equipment capable of detecting differences between the two frequencies generated in the fixed and movable heads is illustrated by a block diagram as a logical system. Sine waves are picked up by the fixed and movable signal pickup heads 17 and 21 from the continuous pulse signal tracks 14 and 13 respectively. The outputs from heads 17 and 21 are fed into amplifiers A–2 and A–1, respectively, and by means of circuitry about to be described in detail, this output information is conveyed to an electronic reversible binary counter BC–1. This counter has a total count capacity of N, and is used to count the difference between the number of pulses generated in pickup heads 17 and 21. Although a binary counter has been specified, it is to be understood that the kind of counters can be chosen to automatically produce one of many possible coding systems, e.g. binary, excess three coded decimal, binary coded decimal, tertiary, etc.

Figure 3:
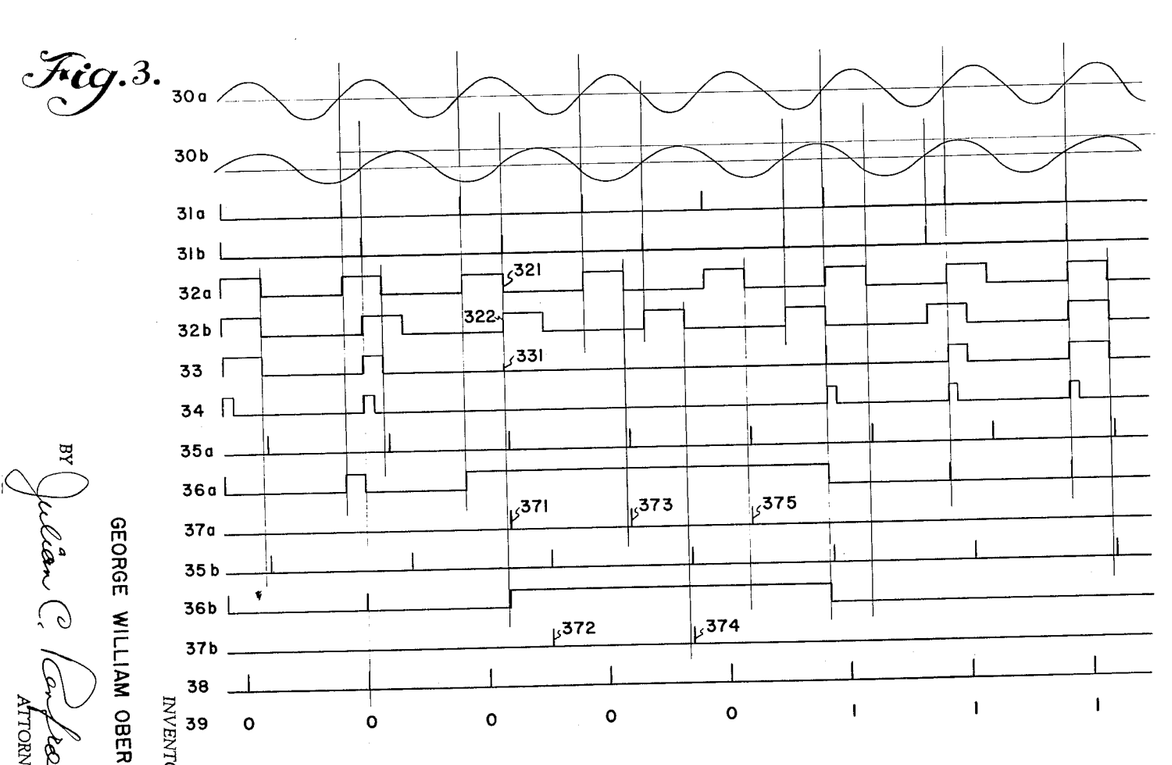
FIGURE 3 illustrates the waveforms produced at designated points in the system shown in FIGURE 2 when the input shaft is turning in the same direction as the drum containing the pulse tracks.

As an example of the operation of this device, assume that input shaft 19 is turning in the same direction as drum 12, but at one-sixth the drum speed. During a period in which eight pulses are obtained from fixed head 17, seven pulses will be obtained from movable head 21. (Note FIG. 3, lines 30a and 30b). It should be obvious that as input shaft 19 continues to rotate at a slower speed that drum 12, the accumulated number of pulses generated in pickup 21 will be less than the number generated in pickup 17 by the number of increments of $$\frac{360°}{N}$$

by which shaft 19 has moved from the zero position. If shaft 19 is rotated in the opposite direction to drum 12, additional pulses will be generated in pickup 21. Thus, at all times the differential count of the pulses of the two pickups is a measure of the angular position of shaft 19 with respect to the zero position.

The system just described measures and integrates incremental angular changes and therefore is preferably utilized in conjunction with some means for starting the reversible binary counter at the proper angle. Accordingly, fixed pickup head 18 and rotatable pickup head 22 are provided and in a similar manner to that shown on FIG. 2 with respect to pickup heads 17 and 21, the output information from heads 18 and 22 is conveyed by appropriate circuitry to second binary counter BC–2. At the instant that the zero mark on track 15 passes pickup head 18, counter BC–2 begins to count the pulses produced in pickup head 17. When the zero mark on track 16 reaches pickup head 22, the counting is stopped, and at this instant, the count in the second binary counter BC–2 is the correct value of the angular position of shaft 19. At this instant, reversible binary counter BC–1 is reset to the number in second counter BC–2. Thus, once during each revolution of drum 12, the count in counter BC–1 is forced to be correct, thereby making unnecessary manual "zeroing."

As seen in FIGURE 2, the output from heads 17 and 21 are shaped by amplification, clipping and differentiation into sharp pulses by amplifiers A–2 and A–1 respectively. The two sets of pulses set flip-flop circuits FF–2 and FF–1 to the "one" states so that gates G–3 and G–2 are open. The pulses from amplifiers A–2 and A–1 also trigger one-shot multivibrators MV–2 and MV–1. For optimum operation the time constant of these multivibrators should be approximately ⅓ of the period of the pulses from the fixed pickup head 17. The pulses obtained from multivibrators MV–2 and MV–1 are applied to coincidence gate G–1, the output of which triggers one-shot multivibrator MV–3 to reset flip-flop circuits FF–2 and FF–1, thus closing gates G–3 and G–2. The trailing edges of the outputs of MV–1 and MV–2 are passed through differentiating circuits C–1 and C–2 respectively and then given a slight delay by the respective delay circuits D–1 and D–2 before being applied to gates G–2 and G–3 respectively. When an output is obtained from gate G–3, one unit is added to the contents of the reversible counter BC–1, whereas an output from G–2 causes one unit to be subtracted from counter BC–1. Section 24 of FIGURE 2 is thus capable of determining incremental changes of shaft position and the summing up of these incremental changes.

Figure 4:
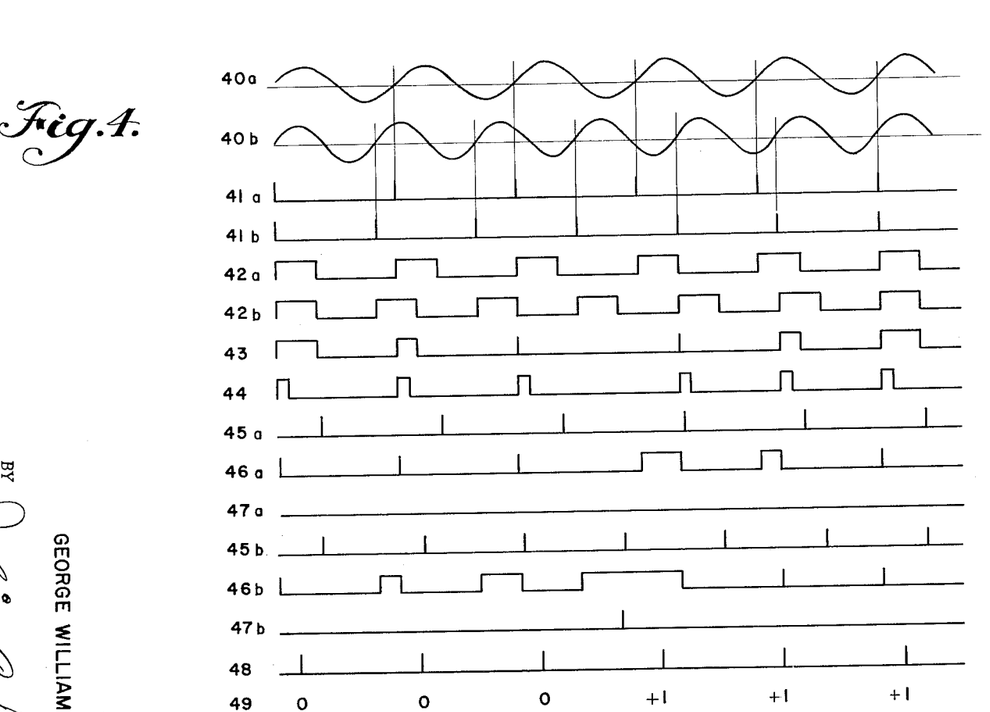
FIGURE 4 illustrates the waveforms produced at designated points in the system shown in FIGURE 2 when the input shaft is turning in a direction opposite to the direction of rotation of the drum.

In FIGURES 3 and 4 there are depicted the waveforms at various points on the block diagram in Section 24 of FIGURE 2 for the feeding of information to counter BC–1 from movable pickup head 21 and fixed pickup head 17. As previously mentioned, in FIGURE 3 are illustrated at 30a and 30b the outputs of the two pickup heads for a period of time equal to eight pulses from fixed head 17 with the input shaft turning in the same direction as the drum at one-sixth of the drum speed. During the period shown, seven pulses are obtained from the movable pickup head 21 connected to the input shaft. Since the number of pulses from the two heads differ by one, the input shaft has obviously turned through an angular increment of one unit. These sine waves produce outputs from amplifiers A–2 and A–1 spaced as shown by pulses 31a and 31b respectively. These pulses trigger multivibrators MV–2 and MV–1 to produce the multivibrator output pulse waveforms 32a and 32b respectively. When pulse waveforms 32a and 32b are fed into gate G–1 the output of the gating circuit is shown by waveform 33 wherein pulses are formed only when coincidence exists between pulses of waveforms 32a and 32b. Pulses 321 and 322 are shown as not coinciding except for a small portion due to lack of steepness of trailing and leading edges respectively. A short pulse 331 is thereby formed as an output of gate G–1. Multivibrator MV–3 is triggered by pulses of waveform 33 and produces the pulses of waveform 34 when so triggered. It can be seen in FIGURE 3 that in the case of short pulse 331 the multivibrator MV–3 is not triggered since pulse 331 is below a minimum standard set for triggering multivibrator MV–3. Pulses 35a and 35b by delays D–2 and D–1 are inputs to gates G–3 and G–2 respectively, each pulse slightly delayed from the trailing edges of the multivibrator output pulses of waveforms 32a and 32b respectively. The other input to gate G–3 from flip-flop circuit FF–2 is shown by waveform 36a. Each output pulse 31a of amplifier A–2 will set flip-flop circuit FF–2 at "one" thus generating an output to gate G–3. But each output pulse 34 from multivibrator MV–3 will reset flip-flop circuit FF–2 to "zero" thus shutting off its output to gate G–3. Therefore it can be seen that pulses of waveform 36a designating an input to gate G–3 from flip-flop circuit FF–2 are generated by pulses of waveform 31a and shut off by pulses of waveform 34.

The input pulses of waveforms 35a and 36a produce the output of gate G–3 as designated by pulses of waveform 37a. Waveforms 35b, input to gate G–2 from multivibrator MV–1, and 36b, input to gate G–2 from flip-flop circuit FF–1, combine to produce 37b, output of gate G–2, in a manner similar to that described above for waveforms 35a, 36a and 37a. The output of amplifier A–2, pulses 31a, is fed through delay D–5, pulses 38, to gate G–14. A READ OUT GATE from a computer or other associated equipment also feeds gate G–14 and in conjunction with pulses 38 determines just when an output figure is read by this associated equipment. The total contents of counter BC–1 at the intervals of time corresponding to read out pulses 38 are designated by numerals of line 39. Since the outputs of gates G-3 and G-2 designated by pulses of waveforms 37a and 37b respectively add or subtract single units from counter BC-1, the total content of 1 on counter BC-1 is obtained at a point where the additive pulse from gate G-3 is not compensated for by a subtractive pulse from gate G-2. It can be observed in FIGURE 3 that the first and second pulses of waveforms 32a and 32b cause no change in the contents of counter BC-1. The third and fourth pulses of waveform 32a by means of pulses 371 and 373 which are the output of gate G-3 cause additions of one unit each to the counter while the corresponding pulses of waveform 32b by means of pulses 372 and 374, output of gate G-2, cause subtractions of one unit each. However, at the instants of read out, pulses 38, the net count in BC-1, line 39 is zero because each +one has been followed by —one. The fifth pulse of waveform 32a, a pulse 375 causes an addition to counter BC-1 which is not compensated for by the fifth pulse of waveform 32b. Thus the net count in counter BC-1 at the 6th read out pulse 38 is "one." The sixth, seventh, and eighth pulses of waveform 32a cause no change in the contents of BC-1. At the eighth pulse of waveform 32a the series of pulses of waveforms 32a and 32b are in phase again completing the sequence which repeats itself as long as the input shaft continues to move at the same rate.

FIGURE 4 shows the signals corresponding to the input shaft rotation opposite to the direction of rotation of the drum at one-sixth of the drum speed. All waveforms of this figure are of a 40 series and indicate waveforms at the same points on FIGURE 2 as the waveforms numbered in the 30 series in FIGURE 3. The net count on the counter BC-1 after the input shaft 19 turns one unit in this case is —one.

The maximum permissible shaft rotation speed in the direction opposite to the drum rotation is approximately one third the drum speed. If the multivibrator pulses are made narrower, this maximum speed can be higher at the expense of the percentage of time for which the read-out of the counter is correct.

As was previously mentioned, the new system just described detects and sums up incremental changes of angular position for the input shaft and therefore an automatic referencing system is desirable to start binary counter BC-1 at the proper angle at close enough intervals of time to assure proper operation after such things as power supply faults. Referring again to FIGURE 2, the additional logical system required for determination of a starting reference and combining it with the system shown in section 24 will now be explained. The flip-flop circuits FF-3 and FF-4 are assumed to be in the "zero" state initially. Gates G-5, G-6, G-7, and G-8 are therefore closed and gate G-4 is open. The contents of the counter BC-2 are assumed to be zero. When the single pulse recorded on the drum in single pulse track 15 which is time coincident with the pulse from A-2 reaches fixed head 18 the pulse passes through and is amplified and shaped to a sharp pulse in amplifier A-3. This pulse sets FF-3 to the "one" condition. Gate 5 is thereby opened allowing pulses to pass through from amplifier A-2 which receives continuous pulses picked up by fixed head 17. These pulses pass through "or" gate G-12 and thence to counter BC-2 which records the number of the continuous pulses. These pulses correspond in time to the leading edge of the voltage waveform of multivibrator MV-2. The first pulse, corresponding to the start pulse, is not counted. Since flip-flop circuit FF-3 is presently set to "one," gate G-4 is closed and gate G-8 is open. When the single pulse recorded on the drum in single pulse track 16 reaches movable head 22 the pulse is amplified by amplifier A-4 and passes through open gate G-8 to reset flip-flop circuit FF-3 to "zero." Gate G-5 is thereby closed and stops the pulses to counter BC-2. At this instant the count in counter BC-2 is either the correct shaft position or is short by one unit. The transition voltage produced when flip-flop circuit FF-3 resets to "zero" is differentiated by capacitor C-3 and the differentiated pulse sets the flip-flop circuit FF-4 to "one." The gate G-4 is now held closed by flip-flop circuit FF-4 and gates G-6 and G-7 are now open. The contents of BC-2 are now transferred to counter BC-1 to provide the correct angle in BC-1 if for any reason the count be incorrect.

The following description explains how the decision is made as to whether the contents of BC-2 should be transferred as is to counter BC-1 or whether one unit should be added to the content of BC-2 before transfer to BC-1. At this point reference should be made to FIGURES 5, 6, and 7. These figures represent the waveforms for the possible relative positions of the pulses from multivibrators MV-1 and MV-2 at the time of receiving a stop pulse on movable head 22. Dotted lines 54, 64 and 74 on the respective figures indicate the range within which the stop pulse may occur in the cases illustrated. It is to be noted that the stop pulse 55, 65, 75 in these figures always has the same relation to the leading edge of the pulse out of multivibrator MV-1. This relationship is due to the mechanical configuration previously shown in FIGURE 1 wherein the movable signal pickup heads 21 and 22 move together and their adjacent recorded pulse tracks are mounted on the same rotatable drum. Transition point 51 also shown in these figures is a point at which the decision is made to count the next following pulse in order for the contents of the counter to be correct. The exact position of this point is determined by the width of the pulse from multivibrator MV-1.

FIGURE 5 shows resulting waveforms when no portion of pulse 53 from multivibrator MV-2, after stop pulse 55 is picked up by movable head 22, coincides with any portion of the pulse 57 out of multivibrator MV-1. Thus no pulse is generated by MV-3 and there is no output from gate G-6. In FIGURE 5 the stop pulse 55 occurs before the transition point 51 and the contents of BC-2 is correct. The trailing edge 56 of pulse 57 from multivibrator MV-1 through D-1 will pass through "or" gate G-9 and Gate G-7, which was opened by FF-4 at stop pulse 55, to reset counter BC-1 to zero and then after delays interposed by delays D-3 and D-4 will first transfer the contents of counter BC-2 through gates G-13 to counter BC-1 and then at the end of delay D-4 will reset flip-flop circuit FF-4 and counter BC-2 to "zero" to re-establish the initial assumed conditions. The reset pulse, which is the trailing edge 56 of pulse 57 from multivibrator MV-1, blocks the possible counting by counter BC-1 of the pulse from gate G-2 which occurs at this instant. The reset pulse to counter BC-1 is produced as a longer pulse in order to override this subtract pulse to counter BC-1 from gate G-2.

FIGURE 6 illustrates the waveforms in the case where the stop pulse 65 from movable head 22 occurs between the transition point 51 and the leading edge 62 of pulse 63 whose position has been determined by the signal from fixed pickup head 17. In this case the counter BC-2 has not counted pulse 63 from multivibrator MV-2. Since the stop pulse is later than the transition point 51 and pulse 63 has not been counted, the contents of counter BC-2 are short by one unit. In this case, during the overlap of pulses 63 and 67 from multivibrators MV-2 and MV-1 respectively, the multivibrator MV-3 is triggered producing pulse 68 which passes through gate G-6 to gate G-10. If the pulse from fixed head 17 which produced the overlap and triggering of MV-3 had passed through gate G-5 and had been counted by counter BC-2, the differentiated and mixed outputs of the first counter stage would have triggered multivibrator MV-4. Multivibrator MV-4 with its time constant longer than multivibrator MV-2 would have inhibited gate G-10 and the count would not have been changed. But here multivibrator MV-3 has been triggered after flip-flop circuit FF–4 is set and the pulse 63 from fixed head 17 has not been counted by counter BC–2. Therefore, the output of MV–3 passes through gates G–6 and G–10 to add the additional "one" count required to counter BC–2 before the transfer of the contents of counter BC–2 to counter BC–1. The trailing edge 66 of pulse 67 from MV–1 passes through gate G–9 and gate G–7, which was opened by flip-flop FF–4 at pulse 65 from movable head 22, and resets counter BC–1 to zero. This same pulse 66 through delay D–3 transfers the contents of counter BC–2 to counter BC–1 by gates G–13 and then through delay D–4 resets counter BC–2 and flip-flop FF–4 to zero to restore the initial conditions.

FIGURE 7 illustrates a third case wherein the leading edge of the pulse 77 from multivibrator MV–1 corresponding to stop pulse 75 occurs within the time interval of pulse 73 from multivibrator MV–2 and the counter BC–2 has counted this pulse 73 from multivibrator MV–2. Therefore, since the pulse 73 between transition point 51 and stop pulse 75 has been counted, the count in counter BC–2 is correct at the time of the occurrence of the stop pulse. Although multivibrator MV–3 is here triggered by the overlap of pulses 73 and 77 from multivibrators MV–2 and MV–1 respectively thereby producing pulse 78, nothing is added to the contents of counter BC–2. This is the case since the counting of pulse 73 causes the first state of counter BC–2 to trigger multivibrator MV–4 thereby producing pulse 79 which inhibits gate G–10 blocking passage of the pulse 78 from multivibrator MV–3 and thereby blocking an addition to the counter. The trailing edge 76 of pulse 77 from multivibrator MV–1 passing through gate G–7 and delays D–3 and D–4 initiates the transfer of the contents of counter BC–2 to counter BC–1, and restores initial conditions as previously explained.

Figure 8:
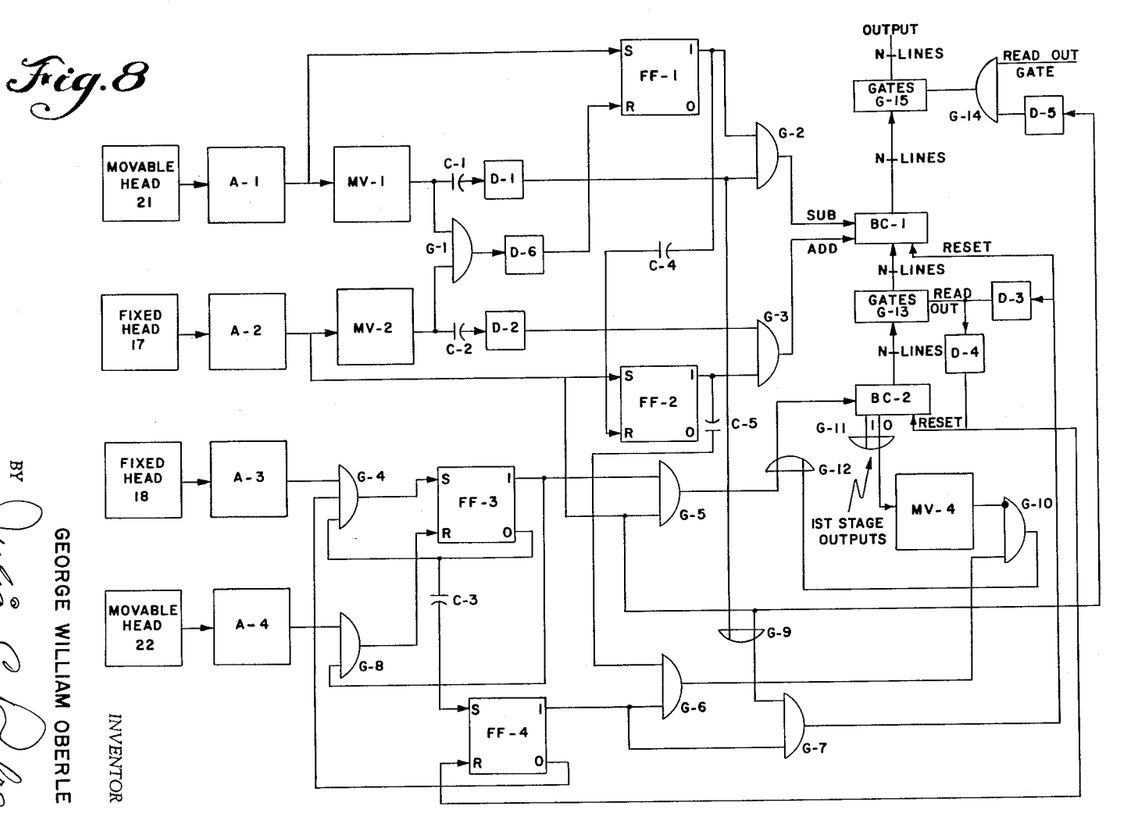
FIGURE 8 is a block diagram illustrating a modified version of the system shown in FIGURE 2.

Another embodiment of the basic features of the present invention is shown in FIGURE 8. This modification eliminates the use of multivibrator MV–3 shown in FIGURE 2. An output pulse from gate G–1 is passed through delay D–6 to the flip-flop circuit FF–1 to reset it to "zero." For proper operation of the circuit the delays D–1 and D–2 should be longer than the delay in D–6. This is necessary in order to prevent the trailing edges of the pulses from multivibrators MV–1 and MV–2 from passing through gates G–2 or G–3 respectively before flip-flop circuits FF–1 and FF–2 are reset when coincidence occurs in Gate G–1 at the time of the trailing edge of either multivibrator pulse. The change of setting in flip-flop circuit FF–1 passes a pulse through capacitor C–4 to reset flip-flop circuit FF–2. This resetting action passes a pulse through capacitor C–5 to gate G–6. In all other ways this circuit operates in the same manner as the description given for the diagram of FIGURE 2.

By the practice of this invention, the techniques of measuring shaft position are substantially advanced, for more accurate measurements are enabled to be made during smaller increments of shaft movement. This allows greater accuracy at times of sampling and other advantages herein described. Various changes may be made in the details of construction without departing from the spirit of the invention or sacrificing any of the advantages thereof.

What is claimed is:

1. A shaft position sensing apparatus for determining the rotational position of a movable member comprising a first signal pickup means attached to the movable member and provided with motion thereby, a second signal pickup means having a fixed position, first and second continuous pulse signal tracks located with portions in proximity to said first and second signal pickup means respectively, driver means to rotate said first and second continuous pulse signal tracks at an approximately constant speed, first and second amplifier means for amplifying and shaping to sharp pulses the signals received from said first and second signal pickup means, a first and second gating means, first and second switching means receiving pulses from said first and second amplifier means respectively which set the said first and second switching means to open said first and second gating means, first and second pulse shaping means receiving pulses from said first and second amplifier means respectively, a third gating means receiving and passing shaped pulses when coincidence occurs between pulses from said first and second pulse shaping means, a third pulse shaping means attached to said third gating means to deliver pulses to said first and second switching means resetting said first and second switching means to close said first and second gating means, counting means receiving signals from said first and second gating means, said counting means upon receiving a signal from said first gating means registering a subtractive action and upon receiving a signal from said second gating means registering an additive action.

2. A shaft position sensing apparatus for determining the rotational position of a movable member comprising a first signal pickup means attached to the movable member and provided with motion thereby, a second signal pickup means having a fixed position, first and second continuous pulse signal tracks located with portions in proximity to said first and second signal pickup means respectively, driver means to rotate said first and second continuous pulse signal tracks at an approximately constant speed, a first and second gating means, first and second switching means receiving pulses from said first and second signal pickup means respectively which set said first and second switching means to open said first and second gating means, first and second pulse shaping means receiving pulses from said first and second signal pickup means respectively, a third gating means receiving and passing shaped pulses when coincidence occurs between pulses from said first and second pulse shaping means, a third pulse shaping means connected to said third gating means to deliver pulses to said first and second switching means resetting said first and second switching means to close said first and second gating means, and counting means receiving signals from said first and second gating means, said counting means upon receiving a signal from said first gating means registering a subtractive action and upon receiving a signal from said second gating means registering an additive action.

3. The shaft position sensing apparatus for determining the rotational position of a movable member as described in claim 2 in combination with a third signal pickup means attached to said movable member and provided with motion thereby, a fourth signal pickup means having a fixed position, first and second single signal pulse tracks located with portions in proximity to said third and fourth signal pickups respectively, means to drive said first and second single signal pulse tracks at an approximately constant speed, a second pulse counting means, and a fourth gating means connected between said third and fourth signal pickup means and said second pulse counting means, said gating means opening to pass pulses to said second pulse counting means during the interval of time in which a pulse is received from said fourth signal pickup means until a pulse is received from said third signal pickup means.

4. A shaft position sensing apparatus for determining the rotational position of a movable member as described in claim 3 wherein a fifth gating means is connected to receive the contents of said second pulse counting means and deliver the contents to said first counting means upon the resetting of said second pulse counting means.

5. A shaft position sensing apparatus for determining the rotational position of a movable member comprising a first signal pickup means attached to the movable member and provided with motion thereby, a second signal pickup means having a fixed position, first and second continuous pulse signal tracks located with portions in proximity to said first and second signal pickup means respectively, driver means to rotate said first and second continuous pulse signal tracks at an approximately constant speed, first and second amplifier means for amplifying and shaping to sharp pulses the signals received from said first and second signal pickup means, a first and second gating means, first and second switching means receiving pulses from said first and second amplifier means respectively which set the said first and second switching means to open said first and second gating means, first and second pulse shaping means receiving pulses from said first and second amplifier means respectively, a third gating means receiving shaped pulses from said first and second pulse shaping means and when there is coincidence between shaped pulses in said third gating means delivering a pulse to said first switching means resetting said first switching means, said second switching means receiving a pulse generated by resetting said first switching means and reset thereby, said first and second switching means delivering signals to said first and second gating means respectively to close said gating means thereby, counting means receiving signals from said first and second gating means said counting means upon receiving a signal from said first gating means registering a subtractive action and upon receiving a signal from said second gating means registering an additive action.

6. A shaft position sensing apparatus for determining the rotational position of a movable member comprising a first signal pickup means attached to the movable member and provided with motion thereby, a second signal pickup means having a fixed position, first and second continuous pulse signal tracks located with portions in proximity to said first and second signal pickup means respectively, driver means to rotate said first and second continuous pulse signal tracks at an approximately constant speed, a first and second gating means, first and second switching means receiving pulses from said first and second signal pickup means respectively which set the said first and second switching means to open a first and second gating means, first and second pulse shaping means receiving pulses from said first and second signal pickup means respectively, a third gating means receiving shaped pulses from said first and second pulse shaping means and when there is coincidence between shaped pulses in said third gating means delivering a pulse to said first switching means resetting said first switching means, said second switching means receiving a pulse generated by resetting said first switching means and reset thereby, said first and second switching means delivering signals to said first and second gating means respectively to close said gating means thereby, and counting means receiving signals from said first and second gating means, said counting means upon receiving a signal from said first gating means registering a subtractive action and upon receiving a signal from said second gating means registering an additive action.

7. The shaft position sensing apparatus for determining the rotational position of a movable member as described in claim 8 in combination with a third signal pickup means attached to the movable member and provided with motion thereby, a fourth signal pickup means having a fixed position, first and second single signal pulse tracks located with portions in proximity to said third and fourth signal pickups respectively, means to drive said first and second single signal pulse tracks at an approximately constant speed, a second pulse counting means, and a fourth gating means connected between said third and fourth signal pick-up means and said second pulse counting means, said gating opening to pass pulses to said second pulse counting means during the interval of time in which a pulse is received from said fourth signal pickup means until a pulse is received from said third signal pickup means.

8. A shaft position sensing apparatus for determining the rotational position of a movable member as described in claim 7 wherein a fifth gating means is connected to receive the contents of said second pulse counting means and deliver the contents to said first counting means upon the resetting of said second pulse counting means.

9. A high speed shaft position to digital converter comprising a drum rotatable at approximately constant speed and having four pulse tracks thereon, fixed pickup means having first and second heads reading a first continuous pulse track and a first single pulse track, respectively, movable pickup means carried by an input shaft and having first and second heads arranged to read a second continuous pulse track and a second single pulse track respectively, first and second pulse shaping means forming and shaping pulses received from said first movable pickup head and said first fixed pickup head respectively, a plurality of gating means allowing the pulses from said first and second pulse shaping means to pass when non-coincidence of pulses from said first and second pulse shaping means occurs in said gating means, a reversible counting means receiving the pulses from said gating means, said counting means registering a subtractive action upon receiving a signal from a first of said gating means, and registering an additive action upon receiving a signal from a second of said gating means, and an automatic referencing means including a second counting means operatively conected to said second movable pickup head and said second fixed pickup head, the pulses registered by said second counting means providing referencing information transferable to said reversible counting means.

10. In a shaft position sensing apparatus for determining the rotational position of a movable member, the combination including first and second amplifying means, first and second signal pickup means delivering signals representative of rotational position to said amplifying means, first and second pulse forming means forming and shaping pulses from signals received through said amplifying means, first and second switching means arranged to receive pulses from said first and second amplifying means, first and second gating means operated by said first and second switching means respectively, said gating means allowing the pulses from said first and second pulse forming means respectively to pass through said gating means when noncoincident pulses from said first and second pulse forming means occur, means sensitive to coincidence of said pulses for closing said gating means when coincidence occurs, and a reversible counting means receiving pulses from said first and second gating means whereby when an output from one of said gating means is obtained it registers a subtractive action, whereas an output from the other of said gating means causes an additive action.

11. The shaft position sensing apparatus as defined in claim 10 in which third and fourth signal pickup means are provided for delivering signals representative of a starting position for said reversible counting means, said third and fourth signal pickup means in combination with amplifying means, pulse forming means, switching means and gating means operatively associated therewith in a like manner to provide a counting action recorded on a second reversible counting means connected thereto, and means for resetting the first-mentioned reversible counting means to the number in said second reversible counting means once during each revolution of the movable member being sensed, whereby the count in said first-mentioned reversible counting means will be correct once each revolution of the movable member.

12. In a device for determining the difference between two input frequencies for obtaining a measure of their difference in order to represent the rotational position of a movable member, the combination including first and second amplifying means, first and second signal pickup means delivering signals respectively to said first and second amplifying means, to be separately amplified therein, first and second pulse forming means for separately forming and shaping pulses from signals received from said first and second amplifying means, first and second gating means for passing the pulses from said first and second pulse forming means when non-coincidence of pulses from said first and second pulse forming means occurs in said gating means, means connected to said first and second pulse forming means to close said gating means when coincidence occurs between pulses from said pulse forming means, and reversible counting means for receiving the pulses from said gating means, said counting means registering a subtractive action upon receiving a signal from said first gating means, and registering an additive action upon receiving a signal from said second gating means.

References Cited in the file of this patent

UNITED STATES PATENTS

| | | |
|---|---|---|
| 2,519,765 | Jefferies | Aug. 22, 1950 |
| 2,636,133 | Hussey | Apr. 21, 1953 |
| 2,656,106 | Stabler | Oct. 20, 1953 |
| 2,680,241 | Gridley | June 1, 1954 |
| 2,691,762 | Cutler | Oct. 12, 1954 |
| 2,717,987 | Hagan | Sept. 13, 1955 |
| 2,730,698 | Daniels | Jan. 10, 1956 |
| 2,734,188 | Jacobs | Feb. 7, 1956 |
| 2,788,519 | Caldwell | Apr. 9, 1957 |